UNITED STATES PATENT OFFICE.

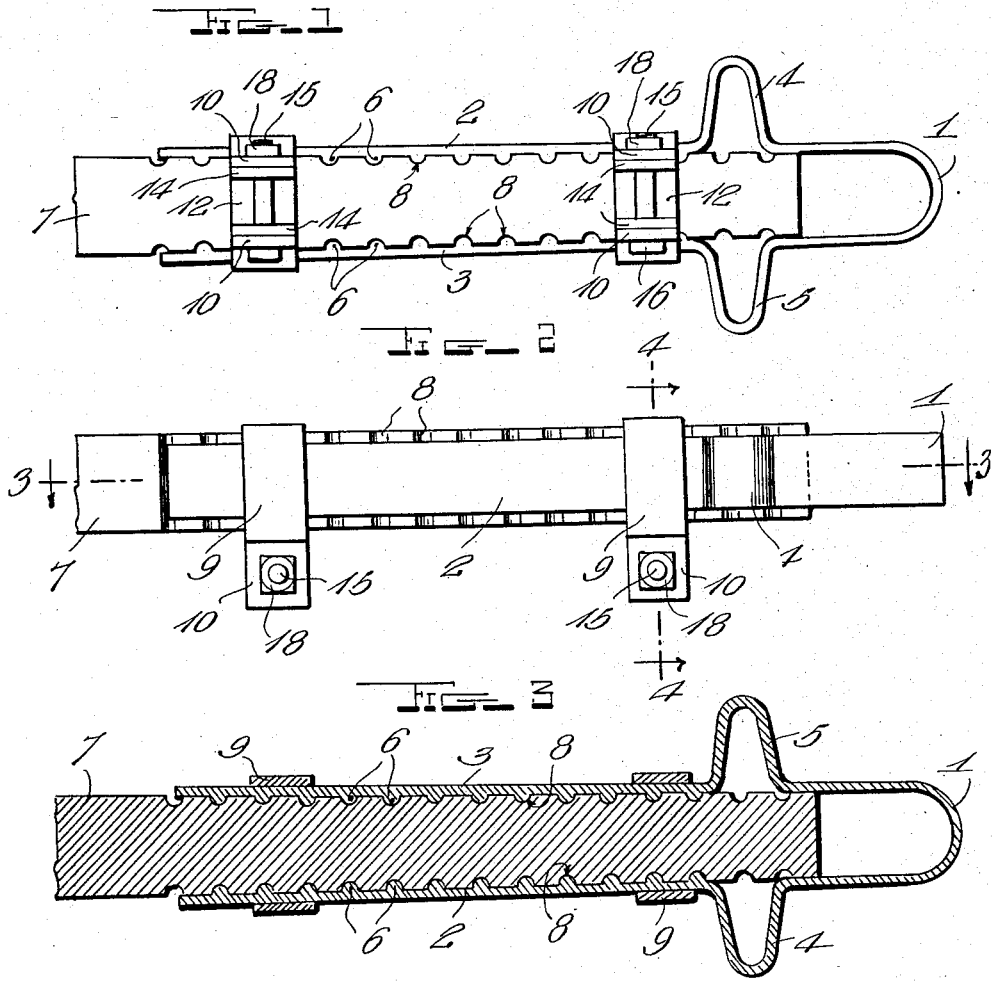

THOMAS CLARK, OF BILLINGS, MONTANA.

WAGON-POLE ATTACHMENT.

1,175,239.  Specification of Letters Patent.  Patented Mar. 14, 1916.

Application filed November 15, 1915. Serial No. 61,583.

*To all whom it may concern:*

Be it known that I, THOMAS CLARK, a citizen of the United States, residing at Billings, in the county of Yellowstone and State of Montana, have invented certain new and useful Improvements in Wagon-Pole Attachments; and I do declare the following to be a full, clear, and exact description of the invention, such as will enable others skilled in the art to which it appertains to make and use the same.

This invention relates to improvements in vehicles and more particularly to improvements in neck yoke attaching means for vehicle poles.

One object of the invention is to provide an improved neck yoke attaching device which may be conveniently applied to any ordinary vehicle pole and arranged so as to be adjusted longitudinally thereon to accommodate draft animals of different sizes.

Another object of the invention is to provide a device of this character which will be simple and cheap in construction and which will be efficient and durable for the purpose.

With these and other objects in view the present invention consists in the combination and arrangement of parts hereinafter referred to, shown in the accompanying drawings, and more particularly pointed out in the appended claims.

In the accompanying drawings in which similar reference numerals designate like parts throughout the several views, Figure 1 is a bottom plan view of a wagon pole having attached thereto a device constructed in accordance with this invention; Fig. 2 is a side elevation of the same; Fig. 3 is a longitudinal sectional view taken on the line 3—3 of Fig. 2; Fig. 4 is a cross sectional view taken on the line 4—4 of Fig. 2; and Fig. 5 is a similar view showing a modified form of the invention.

The preferred embodiment of this invention comprises a strap of metal bent upon itself at 1 to form a pair of spaced arms 2 and 3, the latter being bowed outwardly near their connected ends to form loops 4 and 5. Projecting laterally from the inner sides of these arms 2 and 3 are parallel ribs 6.

The device is attached to the end of a wagon pole 7 having recesses 8 in its opposite sides, the arms 2 and 3 being arranged adjacent said sides and having the ribs 6 disposed in the recesses 8 therein. Disposed around the pole 7 and the arms 2 and 3 are clamping rings 9, the ends of which are bent outwardly to form spaced flanges 10, the latter having openings 11 therein, one of said openings being square for a purpose to be described. Disposed between the flanges 10 is a U-shaped brace 12 having apertures 13 in the arms 14 thereof, said apertures being in alinement with the aforesaid apertures 11 to provide for the passage therethrough of a bolt 15. The head 16 of this bolt 15 is provided with a reduced squared inner extension 17 which is disposed in the square aperture 11 in one of the flanges 10, whereby to prevent the bolt 15 from turning when a clamping nut 18 is being inserted upon or removed therefrom. Two of the rings 9 are to be used, one being disposed adjacent the loops 4 and 5 and the other near the free ends of the arms 2 and 3. The device is thus firmly clamped to the pole of the wagon, and the chains from the neck yokes on the draft horses are connected to the loops 4 and 5, and, if the wagon is to be drawn by more than two horses, the draft links for the forwardmost horse or horses are to be connected to the loop formed in the bend 1 of the strap.

From the foregoing it may be seen that the device may be adjusted longitudinally on the pole 7 by loosening the nuts 18, whereby the ribs 6 may be disengaged from the recesses 8, and the arms 2 and 3 moved the desired amount, when they are again clamped. This provides an efficient means for lengthening or shortening the pole to accommodate draft animals of different sizes.

In Fig. 5 of the drawings, a slightly modified form of the device is shown, the arms 2 and 3 being bent transversely outwardly and provided with spurs 19 on their inner sides instead of the before mentioned ribs to adapt the same for use in connection with a wagon pole having a cylindrical end.

Various other minor changes in form and proportion may be resorted to without departing from the spirit of this invention, and hence I do not wish to limit myself to the construction herein shown and described other than that set forth in the appended claims.

I claim as my invention:—

1. The combination with a wagon pole having recesses in its opposite sides near its end, of a longitudinally adjustable neck yoke attaching device thereon formed from a strap of metal bent upon itself intermediate its ends to form a pair of spaced arms, the latter being bowed outwardly near their connected ends to form loops, projections extending laterally from the inner sides of said arms for engaging said recesses, split rings disposed around said arms, the ends of the former being provided with outwardly extending spaced flanges, U-shaped braces disposed between said flanges, and bolts extending through said flanges and said braces.

2. An attachment of the character described formed from a strap of metal bent upon itself intermediate its ends to form a pair of spaced arms having outwardly extending loops near their connected ends, the inner sides of said arms being provided with lateral projections, split rings disposed around said arms, the ends of the former being provided with outwardly extending spaced flanges, U-shaped braces disposed between said flanges, said flanges and said braces being provided with alined apertures, bolts extending through said apertures, and nuts threaded on said bolts.

In testimony whereof I have hereunto set my hand in presence of two subscribing witnesses.

THOMAS CLARK.

Witnesses:
J. A. COLE,
P. A. TEICHROEW.

Copies of this patent may be obtained for five cents each, by addressing the "Commissioner of Patents, Washington, D. C."